US012054918B2

(12) United States Patent
Hijikata et al.

(10) Patent No.: US 12,054,918 B2
(45) Date of Patent: Aug. 6, 2024

(54) CONSTRUCTION MACHINE

(71) Applicant: Hitachi Construction Machinery Co., Ltd., Tokyo (JP)

(72) Inventors: Seiji Hijikata, Tsukuba (JP); Yasutaka Tsuruga, Ryugasaki (JP); Masatoshi Hoshino, Tsuchiura (JP); Ryou Yagisawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 26 days.

(21) Appl. No.: 17/908,956

(22) PCT Filed: Oct. 18, 2021

(86) PCT No.: PCT/JP2021/038490
§ 371 (c)(1),
(2) Date: Sep. 2, 2022

(87) PCT Pub. No.: WO2022/085645
PCT Pub. Date: Apr. 28, 2022

(65) Prior Publication Data

US 2023/0085676 A1 Mar. 23, 2023

(30) Foreign Application Priority Data

Oct. 19, 2020 (JP) ................................ 2020-175621

(51) Int. Cl.
*E02F 9/22* (2006.01)
*E02F 9/20* (2006.01)
(Continued)

(52) U.S. Cl.
CPC .......... *E02F 9/2228* (2013.01); *E02F 9/2004* (2013.01); *E02F 9/2203* (2013.01);
(Continued)

(58) Field of Classification Search
None
See application file for complete search history.

(56) References Cited

U.S. PATENT DOCUMENTS 4,395,199 A * 7/1983 Izumi ...................... F02D 29/04 60/449
8,689,550 B2 * 4/2014 Wada .................... E02F 9/2217 60/414
(Continued)

FOREIGN PATENT DOCUMENTS

EP 2 351 937 A1 8/2011
JP 5-64253 U 8/1993
(Continued)

OTHER PUBLICATIONS

International Preliminary Report on Patentability (PCT/IB/338 & PCT/IB/373) issued in PCT Application No. PCT/JP2021/038490 dated May 4, 2023, including English translation of document C2 (Japanese-language Written Opinion (PCT/ISA/237), filed on Sep. 2, 2022) (5 pages).
(Continued)

*Primary Examiner* — Kenneth Bomberg
*Assistant Examiner* — Michael Quandt
(74) *Attorney, Agent, or Firm* — Crowell & Moring LLP

(57) ABSTRACT

The present invention provides a construction machine equipped with a pressure accumulation device that accumulates return oil from an actuator, and that can implement both improvement in fuel efficiency with enhancement in workability. To achieve the foregoing, a controller sets an actuator upper limit output power that is an upper limit for an output power of the actuator according to a work mode selected by a work mode selection device, and controls a first control valve and a second control valve such that a sum of an output power of a hydraulic pump and an output power of the
(Continued)

pressure accumulation device does not exceed the actuator upper limit output power.

4 Claims, 4 Drawing Sheets

(51) Int. Cl.

| | |
|---|---|
| ***F15B 1/04*** | (2006.01) |
| ***F15B 13/02*** | (2006.01) |
| *F15B 21/08* | (2006.01) |
| *F15B 21/14* | (2006.01) |

(52) U.S. Cl.

CPC .......... *E02F 9/2217* (2013.01); *E02F 9/2246* (2013.01); *F15B 1/04* (2013.01); *F15B 13/02* (2013.01); *E02F 9/2282* (2013.01); *F15B 21/087* (2013.01); *F15B 21/14* (2013.01); *F15B 2211/20523* (2013.01); *F15B 2211/20546* (2013.01); *F15B 2211/30565* (2013.01); *F15B 2211/426* (2013.01); *F15B 2211/6346* (2013.01); *F15B 2211/6651* (2013.01); *F15B 2211/7053* (2013.01); *F15B 2211/88* (2013.01)

(56) References Cited

U.S. PATENT DOCUMENTS

| | | | | |
|---|---|---|---|---|
| 8,726,649 | B2 * | 5/2014 | Nanjo | E02F 9/2296 60/450 |
| 10,907,666 | B2 * | 2/2021 | Hijikata | F15B 21/14 |
| 11,118,328 | B2 * | 9/2021 | Shimizu | F15B 21/087 |
| 2016/0010663 | A1 | 1/2016 | Zhang et al. | |
| 2016/0281330 | A1 | 9/2016 | Shang et al. | |
| 2022/0162829 | A1 * | 5/2022 | Jung | F15B 21/14 |

FOREIGN PATENT DOCUMENTS

| | | | | |
|---|---|---|---|---|
| JP | 2001-248187 A | | 9/2001 | |
| JP | 2001-295813 A | | 10/2001 | |
| JP | 2008-19910 A | | 1/2008 | |
| JP | 2009-275771 A | | 11/2009 | |
| JP | 2015-31365 A | | 2/2015 | |
| WO | WO-2018061165 A1 | * | 4/2018 | E02F 9/2217 |

OTHER PUBLICATIONS

International Search Report (PCT/ISA/210) issued in PCT Application No. PCT/JP2021/038490 dated Nov. 30, 2021 with English translation (six (6) pages).

Japanese-language Written Opinion (PCT/ISA/237) issued in PCT Application No. PCT/JP2021/038490 dated Nov. 30, 2021 (three (3) pages).

Korean-language Office Action issued in Korean Application No. 10-2022-7030999 dated Jan. 31, 2024 with English translation (10 pages).

Extended European Search Report issued in European Application No. 21882786.3 dated Feb. 8, 2024 (7 pages).

* cited by examiner

FIG. 4

119

| | ACTUATOR UPPER LIMIT OUTPUT POWER | PUMP UPPER LIMIT OUTPUT POWER | ENGINE REVOLUTION SPEED |
|---|---|---|---|
| ENERGY SAVING PRIORITY MODE | 80 % | 60 % | 60 % |
| NORMAL MODE | 100 % | 80 % | 80 % |
| WORKABILITY PRIORITY MODE | 120 % | 100 % | 100 % |

CONSTRUCTION MACHINE

TECHNICAL FIELD

The present invention relates to a construction machine such as a hydraulic excavator.

BACKGROUND ART

Patent Document 1 describes a fluid pressure actuator control circuit that supplies hydraulic fluid accumulated in an accumulator (pressure accumulation device) to a boom cylinder and accordingly lowers a flow rate of hydraulic fluid sent from a pump to the boom cylinder by an amount corresponding to the supplied amount of the hydraulic fluid, whereby fuel cost can be improved.

PRIOR ART DOCUMENT

Patent Document

Patent Document 1: JP-2009-275771-A

SUMMARY OF THE INVENTION

Problem to be Solved by the Invention

However, in the fluid pressure actuator control circuit described in Patent Document 1, the pump flow rate is reduced by an amount corresponding to the accumulator flow rate, and, therefore, enhancement of workability by enhanced velocity of a fluid pressure actuator cannot be expected. In addition, Patent Document 1 states that, though enhancement of workability due to enhanced velocity of the fluid pressure actuator can be expected when the accumulator flow rate is simply added to the pump flow rate, the energy required for the pump cannot be reduced, so that it does not result in a reduction in fuel cost of the pump-driving engine.

The present invention has been made in consideration of the above problem. It is an object of the present invention to provide a construction machine equipped with a pressure accumulation device for accumulating return oil from an actuator and capable of implementing both improvement in fuel cost and enhancement in workability.

Means for Solving the Problem

To achieve the above object, according to the present invention, there is provided a construction machine including: a prime mover; a hydraulic pump driven by the prime mover; an actuator driven by the hydraulic pump; a pressure accumulation device that accumulates return oil from the actuator; a first control valve capable of adjusting a flow rate of hydraulic fluid supplied from the hydraulic pump to the actuator; a second control valve capable of adjusting a flow rate of hydraulic fluid supplied from the pressure accumulation device to the actuator; an operation device for giving an instruction on an operation of the actuator; and a controller that is inputted with an operation signal from the operation device and outputs controls signals to the first control valve and the second control valve, in which the construction machine includes a work mode selection device for selecting a work mode of the construction machine, and the controller is configured to set actuator upper limit output power that is an upper limit for output power of the actuator according to the work mode selected by the work mode selection device, and controls the first control valve and the second control valve such that a sum of an output power of the hydraulic pump and an output power of the pressure accumulation device does not exceed the actuator upper limit output power.

According to the present invention configured as above, when the actuator upper limit output power is below the sum of the maximum output power of the hydraulic pump and the maximum output power of the pressure accumulation device, fuel cost can be improved by lowering the output powder of the hydraulic pump. In addition, when the actuator upper limit output power exceeds the maximum output power of the hydraulic pump, workability can be enhanced by compensating for the output power of the hydraulic pump by the output power of the pressure accumulation device.

Advantages of the Invention

According to the present invention, it is possible to realize improvement in fuel cost and to realize enhancement in workability, in a construction machine equipped with a pressure accumulation device for accumulating return oil from an actuator.

BRIEF DESCRIPTION OF THE DRAWINGS

FIG. 4 is a diagram depicting contents of a work mode setting map depicted in FIG. 2.

MODE FOR CARRYING OUT THE INVENTION

Figure 1:
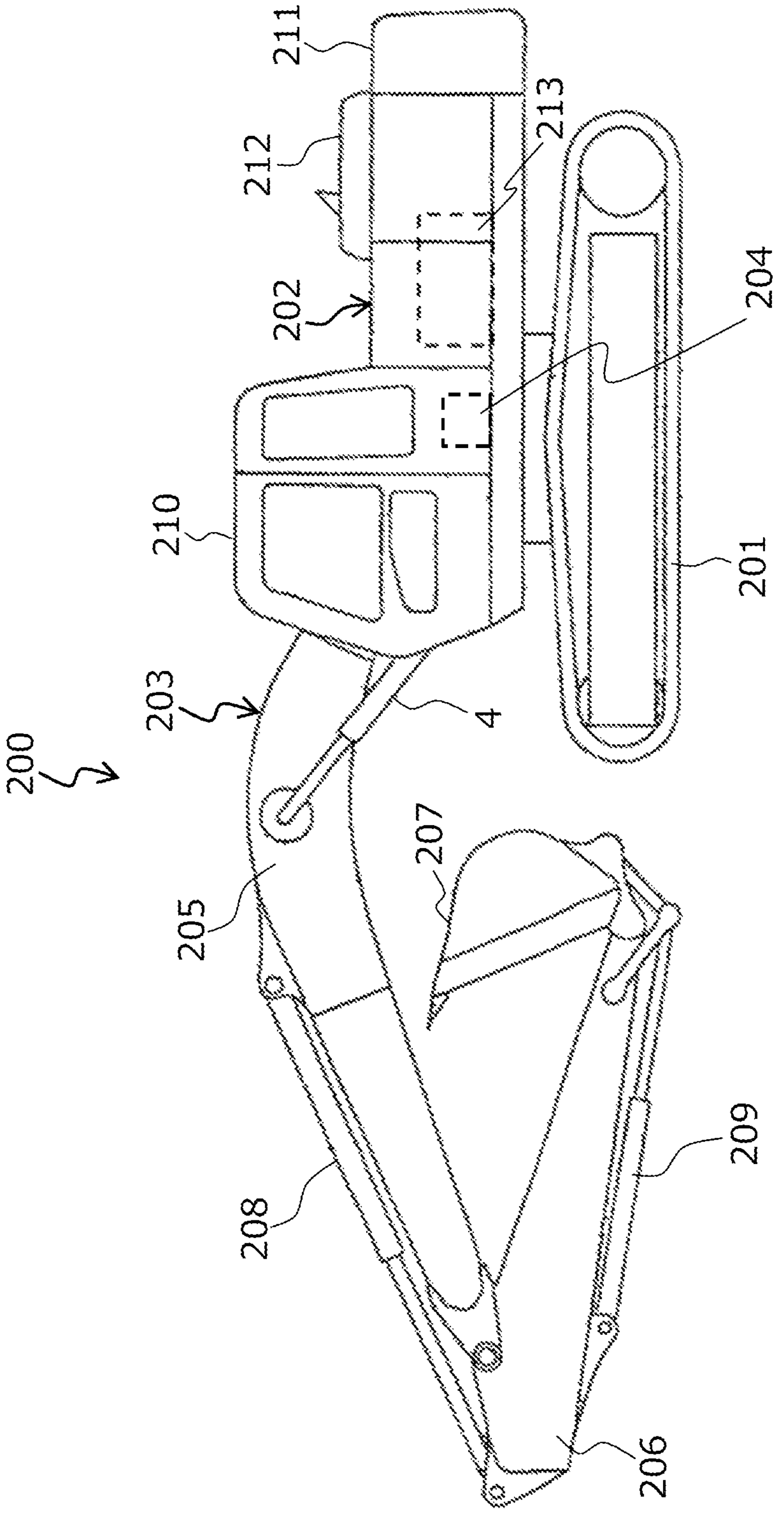
FIG. 1 is a side view of a hydraulic excavator according to an embodiment of the present invention.

A hydraulic excavator taken as an example of a construction machine according to an embodiment of the present invention will be described below with reference to the drawings. Note that, in each drawing, the equivalent members are denoted by the same reference characters and overlapping descriptions thereof will be omitted as required.

FIG. 1 is a side view of the hydraulic excavator according to the present embodiment.

As depicted in FIG. 1, the hydraulic excavator 200 includes a track structure 201, a swing structure 202 that is disposed on the track structure 201 in a swingable manner and that constitutes a machine body, and a work device 203 that is mounted to the swing structure 202 in a vertically rotatable manner and that performs soil excavation and the like. The swing structure 202 is driven by a swing motor 204.

The work device 203 includes a boom 205 attached to the swing structure 202 in a vertically rotatable manner, an arm 206 attached to a tip of the boom 205 in a vertically rotatable manner, and a bucket 207 attached to a tip of the arm 206 in a vertically rotatable manner. The boom 205 is driven by a boom cylinder 4, the arm 206 is driven by an arm cylinder 208, and the bucket 207 is driven by a bucket cylinder 209.

A cab 210 is provided at a front-side position of the swing structure 202, and a counter weight 211 for securing weight balance is provided at a rear-side position. A machine room 212 is provided between the cab 210 and the counter weight 211. An engine as a prime mover, a hydraulic pump, a control valve 213 and the like are accommodated in the machine room 212. The control valve 213 controls the flow of hydraulic fluid supplied from the hydraulic pump to each actuator. Note that the prime mover in the present invention is not limited to the engine, but may be a motor of which the revolution speed can be adjusted through an inverter.

Figure 2:
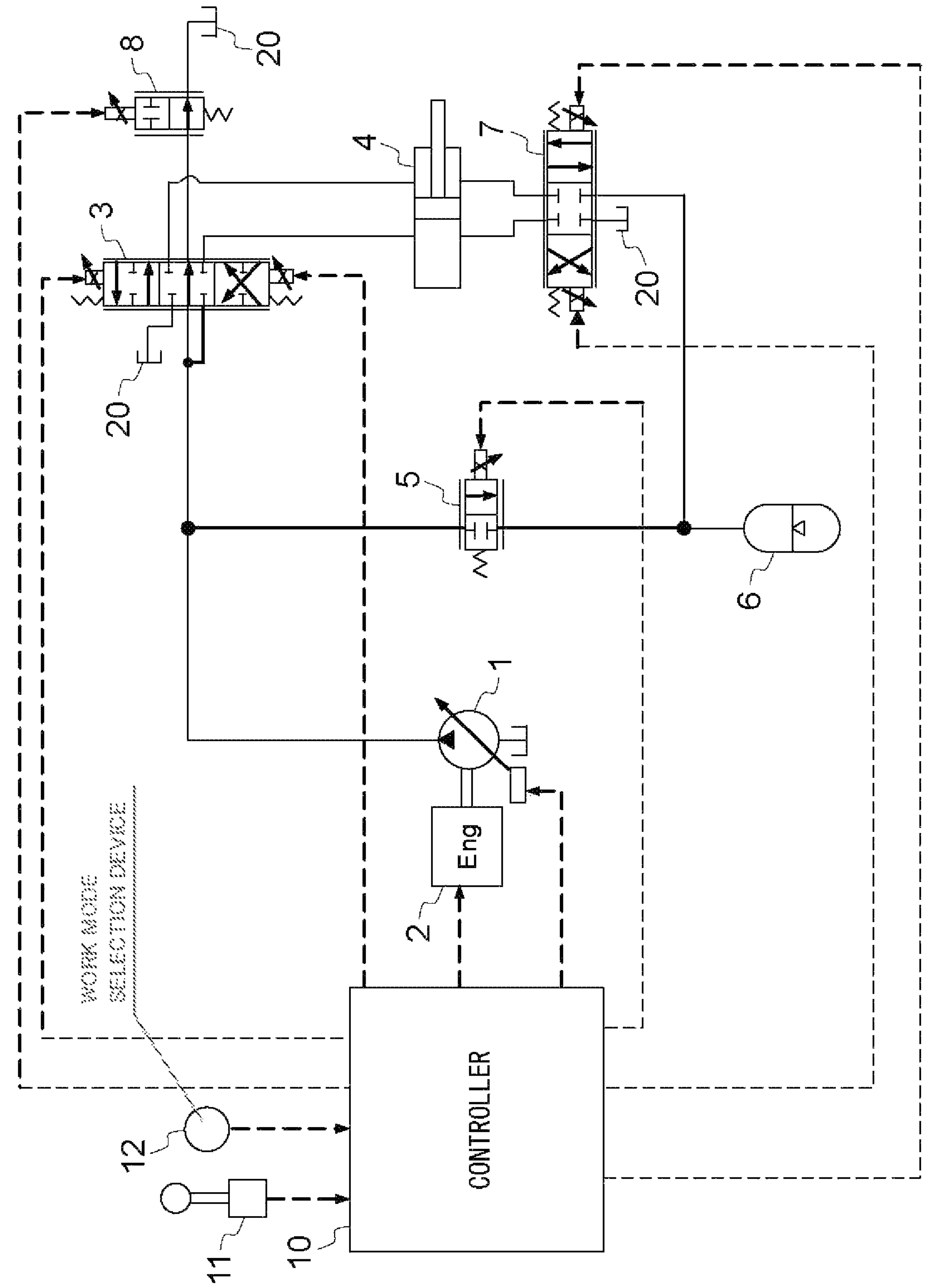
FIG. 2 is a circuit diagram of a hydraulic drive system mounted on the hydraulic excavator depicted in FIG. 2.

FIG. 2 is a circuit diagram of a hydraulic drive system mounted on the hydraulic excavator 200. Note that, in FIG. 2, only parts relating to driving of the boom cylinder 4 are depicted, and parts relating to driving of other actuators are omitted.

In FIG. 2, the hydraulic drive system according to the present embodiment includes an engine 2 as a motive power source, the hydraulic pump 1 driven by the engine 2, the boom cylinder 4 driven by the hydraulic pump 1, a center bypass type control valve 3 that adjusts a direction and a flow rate of hydraulic fluid supplied from the hydraulic pump 1 to the boom cylinder 4, an accumulator 6 as a pressure accumulation device in which pressure is accumulated by the hydraulic pump 1, a control valve 5 that controls the flow rate of hydraulic fluid flowing from the hydraulic pump 1 into the accumulator 6, a control valve 7 that adjusts the direction and flow rate of hydraulic fluid supplied from the accumulator 6 to the boom cylinder 4, a center bypass cut valve 8 that prevents hydraulic fluid of the hydraulic pump 1 from flowing to a tank 20, a boom operation lever 11 as an operation device for giving an instruction on an operation of the boom cylinder 4, a work mode selection device 12 for changing over an operation mode (hereinafter, referred to as a work mode) of the hydraulic excavator 200, and a controller 10 that controls the flow rate of the hydraulic pump 1, the revolution speed of the engine 2, the flow rates or opening degrees of the control valves 3, 5, and 7, according to the operation amount of the boom operation lever 11 and the work mode set by the work mode selection device 12.

The controller 10 increases the flow rate of the hydraulic pump 1 according to the lever operation amount, and changes over at least one of the control valves 3 and 7 according to the lever operation direction, to supply hydraulic fluid from the hydraulic pump 1 or the accumulator 6 to an oil chamber on one side of the boom cylinder 4, and to return the hydraulic working oil discharged from an oil chamber on the other side to the tank 20, when the boom operation lever 11 is operated, so that the boom cylinder 4 can be elongated and contracted. In addition, the controller 10 opens the control valve 5 to supply hydraulic fluid from the hydraulic pump 1 to the accumulator 6 when the pressure on the accumulator 6 is lowered, so that the pressure on the accumulator 6 can be held.

In addition, the controller 10 selects one of a plurality of work modes (in the present embodiment, normal mode, energy saving priority mode, and workability priority mode) according to the operation of the work mode selection device 12, and, according to the work mode selected, sets an upper limit for output power of the boom cylinder 4 (hereinafter referred to as actuator upper limit output power), an upper limit for output power of the hydraulic pump 1 (hereinafter referred to as pump upper limit output power), and a revolution speed of the engine 2 (hereinafter referred to as engine revolution speed).

Figure 3:
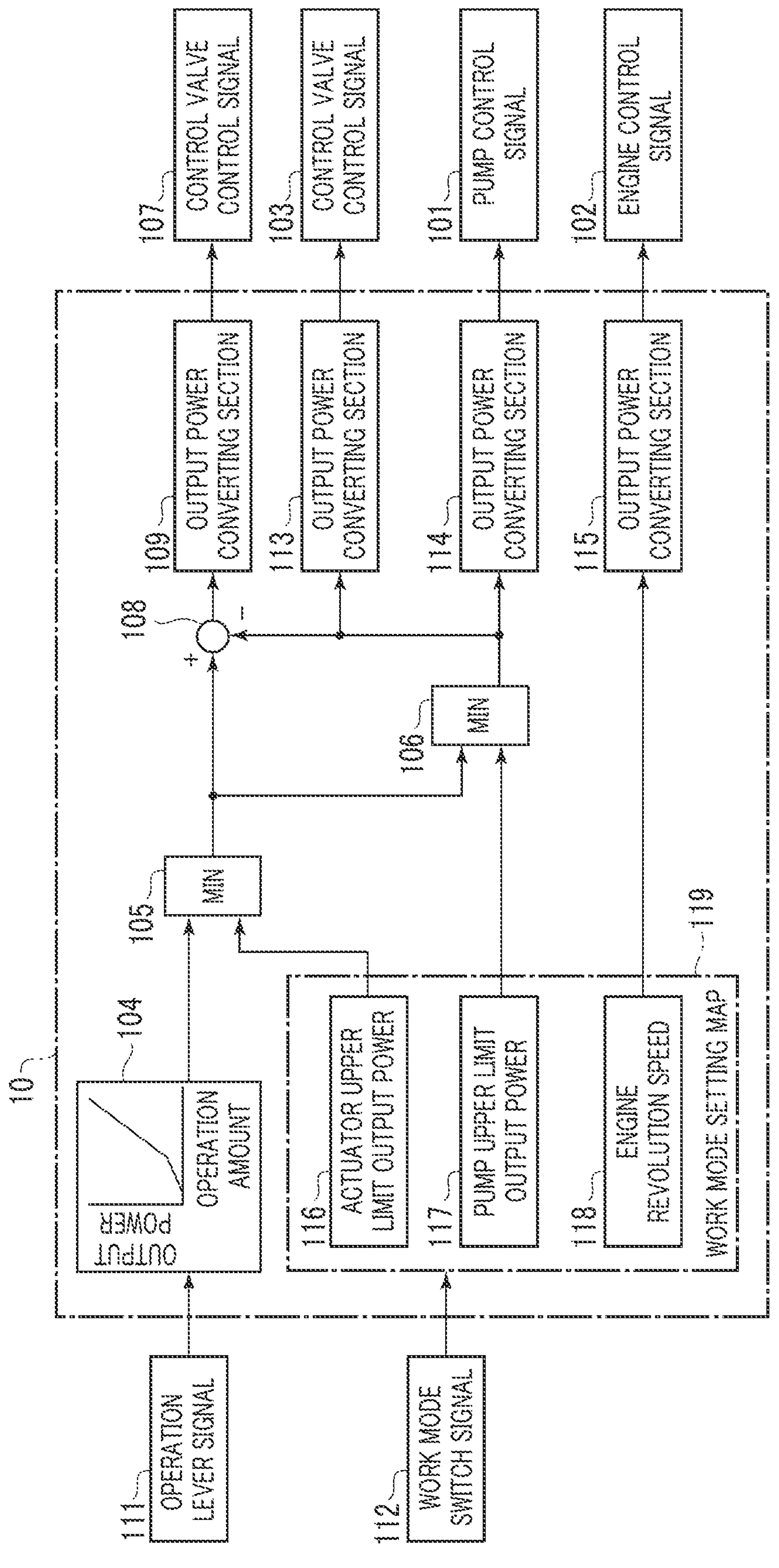
FIG. 3 is a diagram depicting contents of the processing of a controller depicted in FIG. 2.

FIG. 3 is a diagram depicting contents of processing of the controller 10.

In FIG. 3, an operation lever signal 111 is a signal inputted to the controller 10 according to the operation of the boom operation lever 11. A work mode switch signal 112 is a signal inputted to the controller 10 according to the operation of a work mode switch.

A function generating section 104 converts the operation lever signal 111 (the operation amount of the boom operation lever 11) into output power of the boom cylinder 4, and outputs it to a minimum selecting section 105.

The work mode setting map 119 sets an actuator upper limit output power 116, a pump upper limit output power 117, and an engine revolution speed 118 according to the work mode switch signal 112 (work mode), outputs the actuator upper limit output power 116 to the minimum selecting section 105, outputs the pump upper limit output power 117 to a minimum selecting section 106 and outputs the engine revolution speed 118 to an output power converting section 115.

Details of the work mode setting map 119 will be described with reference to FIG. 4.

In FIG. 4, the work mode setting map 119 stores the actuator upper limit output power 116, the pump upper limit output power 117, and the engine revolution speed 118 for each of a plurality of work modes (the energy saving priority mode, the normal mode, and the workability priority mode). The actuator upper limit output power 116 and the pump upper limit output power 117 are represented in ratio to output power of the engine 2 when the engine 2 is operated at a rated revolution speed (for example, 1,800 rpm) (hereinafter referred to as engine maximum output power), while the engine revolution speed 118 is represented in ratio to the rated revolution speed.

In the normal mode, the actuator upper limit output power 116 is set at 100%, the pump upper limit output power 117 is set at 80%, and the engine revolution speed 118 is set at 80%. The deficiency (20% at maximum) of the output power (80% at maximum) of the hydraulic pump 1 relative to the output power (100%) of the actuator 4 is compensated for by output power of the accumulator 6. As a result, while obtaining output power of the actuator 4 corresponding to the engine maximum output power, the output power of the engine 2 can be suppressed to or below 80% of the maximum output power, so that fuel cost can be improved. Note that, in the present embodiment, for simplicity of description, pressure loss of the valves and loss of the pump are not taken into account, and it is assumed that the output power of the actuator 4 is equal to the sum of the output power of the hydraulic pump 1 and the output power of the accumulator 6. In addition, while the boom cylinder 4 is taken as an example of the actuator, the actuator is not particularly limited.

In the energy saving priority mode, the actuator upper limit output power 116 is set at 80%, the pump upper limit output power 117 is set at 60%, and the engine revolution speed 118 is set at 60%. The deficiency (20% at maximum) of the output power (60% at maximum) of the hydraulic pump 1 relative to the output power (80% maximum) of the actuator 4 is compensated for by the output power of the accumulator 6. As a result, while obtaining output power of the actuator 4 corresponding to 80% of the engine maximum output power, the output power of the engine 2 can be suppressed to or below 60% of the maximum output power, and fuel cost can further be improved.

In the workability priority mode, the actuator upper limit output power 116 is set at 120%, the pump upper limit output power 117 is set at 100%, and the engine revolution speed 118 is set at 100%. The deficiency (20% at maximum) of the output power (100% at maximum) of the hydraulic pump 1 relative to the output power (120% at maximum) of the actuator 4 is compensated for by the output power of the accumulator 6. As a result, output power of the actuator 4 greater than the engine maximum output power can be obtained.

In each work mode, by setting the pump upper limit output power to a value obtained by subtracting the maximum output power (20%) of the accumulator 6 from the actuator upper limit output power, it is possible to utilize the output power of the accumulator 6 maximally, and to minimize the output power of the hydraulic pump 1. In addition, by setting the engine revolution speed to a ratio equivalent to the pump upper limit output power, the output power of the engine 2 can be suppressed to a bare minimum.

Returning to FIG. 3, the minimum selecting section 105 selects the smaller one of the actuator output power from the function generating section 104 and the actuator upper limit output power 116 from the work mode setting map 119, as actuator output power, and outputs the actuator output power to the minimum selecting section 106 and a subtracting section 108. As a result, the output power of the actuator 4 can be limited to or below the actuator upper limit output power 116.

The minimum selecting section 106 selects the smaller one of the actuator output power from the minimum selecting section 105 and the pump upper limit output power 117 from the work mode setting map 119, as pump output power, and outputs the pump output power to the subtracting section 108, an output power converting section 113, and an output power converting section 114. As a result, the output power of the hydraulic pump 1 can be limited to or below the pump upper limit output power 117.

The subtracting section 108 subtracts the pump output power from the minimum selecting section 106 from the accumulator output power from the minimum selecting section 105 to compute accumulator output power, and outputs the accumulator output power to the output power converting section 109. As a result, the deficiency of the output power of the hydraulic pump 1 relative to the output power of the actuator 4 can be compensated for by the output power of the accumulator 6.

The output power converting section 109 outputs a control valve control signal 107 for making the output power of the accumulator 6 coincide with the accumulator output power from the subtracting section 108, to the control valve 7. The output power converting section 113 converts the pump output power from the minimum selecting section 106 into an operation amount of the control valve 3, and outputs a control valve control signal 103 according to the operation amount to the control valve 3. The output power converting section 114 outputs a pump control signal 101 for making the output power of the hydraulic pump 1 coincide with the pump output power from the minimum selecting section 106, to the hydraulic pump 1. The output power converting section 115 outputs an engine control signal 102 for making the revolution speed of the engine 2 coincide with the engine revolution speed 118 from the work mode setting map 119, to the engine 2.

(Effect)

In the present embodiment, the construction machine 200 including the prime mover 2, the hydraulic pump 1 driven by the prime mover 2, the actuator 4 driven by the hydraulic pump 1, the pressure accumulation device 6 accumulating return oil from the actuator 4, the first control valve 3 capable of adjusting the flow rate of hydraulic fluid supplied from the hydraulic pump 1 to the actuator 4, the second control valve 7 capable of adjusting the flow rate of hydraulic fluid supplied from the pressure accumulation device 6 to the actuator 4, the operation device 11 for giving an instruction on an operation of the actuator 4, and the controller 10 that is inputted with an operation signal from the operation device 11 and outputs control signals to the first control valve 3 and the second control valve 7, includes a work mode selection device 12 for selecting a work mode of the construction machine 200, and the controller 10 sets an actuator upper limit output power which is an upper limit output power for the actuator 4 according to the work mode selected by the work mode selection device 12, and controls the first control valve 3 and the second control valve 7 such that the sum of the output power of the hydraulic pump 1 and the output power of the pressure accumulation device 6 does not exceed the actuator upper limit output power.

According to the present embodiment configured as above, when the upper limit output power of the actuator 4 is below the sum of the maximum output power of the hydraulic pump 1 and the maximum output power of the pressure accumulation device 6, the output power of the hydraulic pump 1 is lowered, so that fuel cost can be improved. In addition, when the upper limit output power of the actuator 4 is above the maximum output power of the hydraulic pump 1, the output power of the hydraulic pump 1 is compensated for by the output power of the pressure accumulation device 6, so that workability can be enhanced.

In addition, the controller 10 in the present embodiment lowers the pump upper limit output power which is an upper limit for the output power of the hydraulic pump 1 according to the lowering in the actuator upper limit output power, and controls the first control valve 3 such that the output power of the hydraulic pump 1 does not exceed the pump upper limit output power. As a result, it is possible to utilize the output power of the pressure accumulation device 6 maximally, and to minimize the output power of the hydraulic pump 1.

Besides, the controller 10 in the present embodiment lowers the revolution speed of the prime mover 2 according to the lowering in the pump upper limit output power. As a result, it is possible to use the prime mover 2 in a region of high energy efficiency, and to further improve fuel cost.

In addition, the controller 10 in the present embodiment sets the actuator upper limit output power to a value (120%) greater than the output power (100%) of the prime mover 2 operated at a rated revolution speed, when a work mode in which workability is given priority (workability priority mode) is selected by the work mode selection device 12. As a result, the output power of the actuator 4 can be made greater than the maximum output power of the prime mover 2.

While the embodiment of the present invention has been described in detail above, the present invention is not limited to the above embodiment and includes various modifications. For example, the above described embodiment has been described in detail for facilitating understanding of the present invention, and are not necessarily limited to those including all the configurations described.

DESCRIPTION OF REFERENCE CHARACTERS

1: Hydraulic pump
2: Engine (prime mover)
3: Control valve (first control valve)
4: Boom cylinder (actuator)
5: Control valve
6: Accumulator (pressure accumulation device)
7: Control valve (second control valve)
8: Center bypass cut valve
10: Controller
11: Boom operation lever (operation device)
12: Work mode switch (work mode selection device)
20: Tank

101: Pump control signal
102: Engine control signal
103: Control valve control signal
104: Function generating section
105: Minimum selecting section
106: Minimum selecting section
107: Control valve control signal
108: Subtracting section
109: Output power converting section
111: Operation lever signal
112: Work mode switch signal
113: Output power converting section
114: Output power converting section
115: Output power converting section
116: Actuator upper limit output power
117: Pump upper limit output power
118: Engine revolution speed
119: Work mode setting map
200: Hydraulic excavator (construction machine)
201: Track structure
202: Swing structure
203: Work device
204: Swing motor (actuator)
205: Boom
206: Arm
207: Bucket
208: Arm cylinder (actuator)
209: Bucket cylinder (actuator)
210: Cab
211: Counter weight
212: Machine room
213: Control valve

The invention claimed is:

1. A construction machine comprising:

a prime mover;

a hydraulic pump driven by the prime mover;

an actuator driven by the hydraulic pump;

a pressure accumulation device that accumulates return oil from the actuator;

a first control valve capable of adjusting a flow rate of hydraulic fluid supplied from the hydraulic pump to the actuator;

a second control valve capable of adjusting a flow rate of hydraulic fluid supplied from the pressure accumulation device to the actuator;

an operation device for giving an instruction on an operation of the actuator; and a controller that is inputted with an operation signal from the operation device and outputs control signals to the first control valve and the second control valve, wherein the construction machine includes a work mode selection device for selecting a work mode of the construction machine, and the controller is configured to set, according to the work mode selected by the work mode selection device, an actuator upper limit output power that is an upper limit for an output power of the actuator and a pump upper limit output power that is an upper limit for an output power of the hydraulic pump, calculate, based on an operation signal from the operation device, an actuator output power that is an output power of the actuator, output, to the hydraulic pump, a pump control signal according to a minimum value of the actuator output power, the actuator upper limit output power and the pump upper limit output power, output, to the first control valve, a control valve control signal according to the minimum value, and output, to the second control valve, a control valve control signal according to a value that is obtained by subtracting the minimum value from a smaller one of the actuator output power and the actuator upper limit output power.

2. The construction machine according to claim 1, wherein the controller is configured to lower the pump upper limit output power according to a lowering in the actuator upper limit output power.

3. The construction machine according to claim 2, wherein the controller is configured, when lowering the pump upper limit output power according to the lowering in the actuator upper limit output power, to lower a revolution speed of the prime mover.

4. The construction machine according to claim 1, wherein the controller is configured to set the actuator upper limit output power to be greater than an output power of the prime mover operated at a rated revolution speed, in a case where a work mode in which enhancement of workability due to enhancement of velocity of the actuator takes priority over reduction in fuel cost of the prime mover is selected by the work mode selection device.

* * * * *